(12) United States Patent
Takaku

(10) Patent No.: US 7,175,374 B2
(45) Date of Patent: Feb. 13, 2007

(54) MACHINE TOOL

(75) Inventor: Masakazu Takaku, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 0 days.

(21) Appl. No.: 11/362,770

(22) Filed: Feb. 28, 2006

(65) Prior Publication Data
US 2006/0147287 A1 Jul. 6, 2006

Related U.S. Application Data

(62) Division of application No. 10/415,068, filed as application No. PCT/JP01/09442 on Oct. 26, 2001, now Pat. No. 7,037,248.

(30) Foreign Application Priority Data
Oct. 27, 2000 (JP) ............................. 2000-328857

(51) Int. Cl.
*B23C 1/00* (2006.01)

(52) U.S. Cl. ...................... 409/194; 409/144; 409/232; 408/11; 408/7; 29/593

(58) Field of Classification Search ................ 483/10, 483/110; 409/231, 232, 233, 234, 144, 186, 409/187, 193, 194, 207, 208; 29/593, 27 R, 29/712; 408/11, 16, 159, 239 R, 7, 8, 9, 408/10; 700/174, 175, 176, 177, 178, 183, 700/187, 188, 189, 190, 191, 192, 193; 83/62.1, 83/74
See application file for complete search history.

(56) References Cited

U.S. PATENT DOCUMENTS

| 4,227,144 A | 10/1980 | Lang et al. |
| 5,256,010 A | 10/1993 | Hehl et al. |

(Continued)

FOREIGN PATENT DOCUMENTS

EP 708391 A2 7/1996

(Continued)

OTHER PUBLICATIONS

Document for Publications Submission with English translation thereof, mail date Dec. 2, 2004.

(Continued)

*Primary Examiner*—Dana Ross
(74) *Attorney, Agent, or Firm*—David S. Safran

(57) ABSTRACT

A method and a device for detecting the incorrect chucking of a machine tool capable of easily and surely detecting a chucking error; the method, comprising the steps of measuring, by a sensor (12), the change of a distance (d) between the sensor (12) and the outer peripheral surface of the flange part (2B) of a tool holder (2) installed in a spindle (3) through all around the periphery of the tool holder while rotating the tool holder (2), performing a FFT analysis of the measured data by a CPU (18), extracting a fundamental frequency component, and calculating the amplitude thereof, whereby the eccentric amount of the tool holder (2) can be calculated by using the amplitude of the fundamental frequency component and, when the eccentric amount exceeds a preset allowable value, the tool holder (2) is judged to cause an incorrect chucking.

1 Claim, 14 Drawing Sheets

U.S. PATENT DOCUMENTS

| | | |
|---|---|---|
| 5,361,470 A | 11/1994 | Hamada et al. |
| 5,423,643 A | 6/1995 | Suzuki et al. |
| 5,513,113 A | 4/1996 | Okada et al. |
| 5,735,028 A | 4/1998 | Furusawa et al. |
| 5,910,894 A | 6/1999 | Pryor |
| 5,917,726 A | 6/1999 | Pryor |
| 6,474,914 B1 | 11/2002 | Lang |

FOREIGN PATENT DOCUMENTS

| | | |
|---|---|---|
| JP | 49-125972 A | 12/1974 |
| JP | 61-25753 A | 2/1986 |
| JP | 2-243252 A | 9/1990 |
| JP | 9-29577 | 2/1997 |
| JP | 10-138099 A | 5/1998 |
| JP | 10-267749 A | 10/1998 |
| JP | 11-114707 A | 4/1999 |
| JP | 2000-47 U | 6/2000 |

OTHER PUBLICATIONS

KEYENCE Sensor Application.

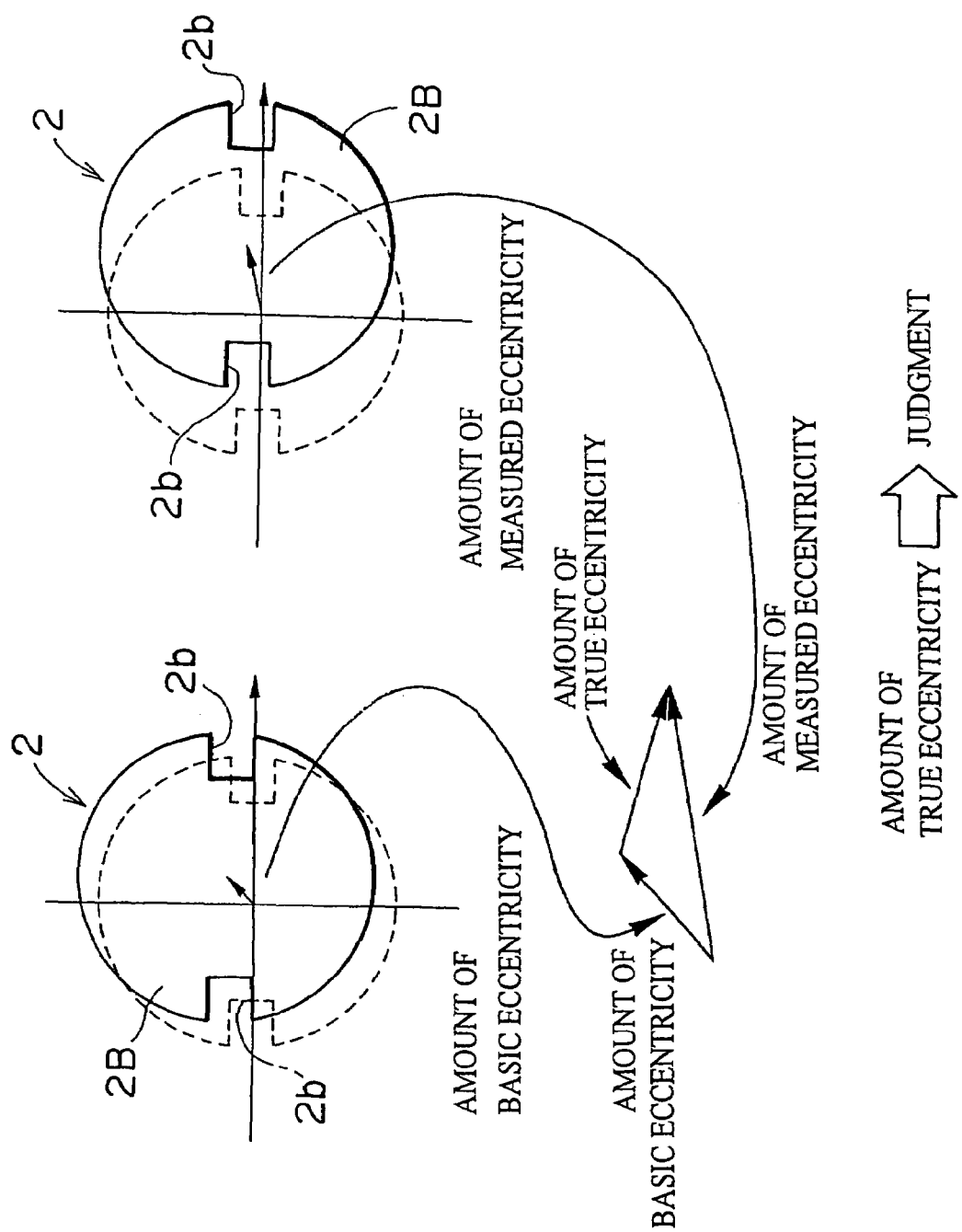

FIG.10(b)

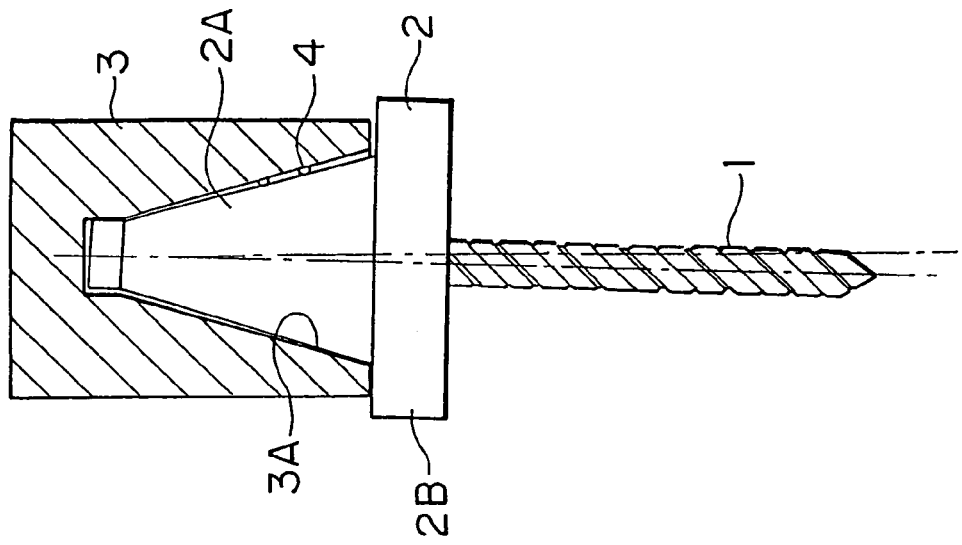
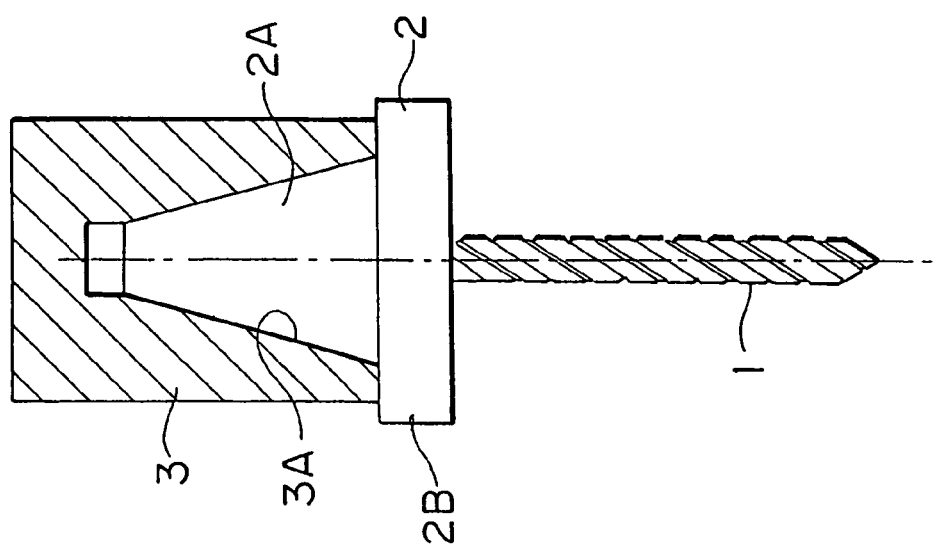

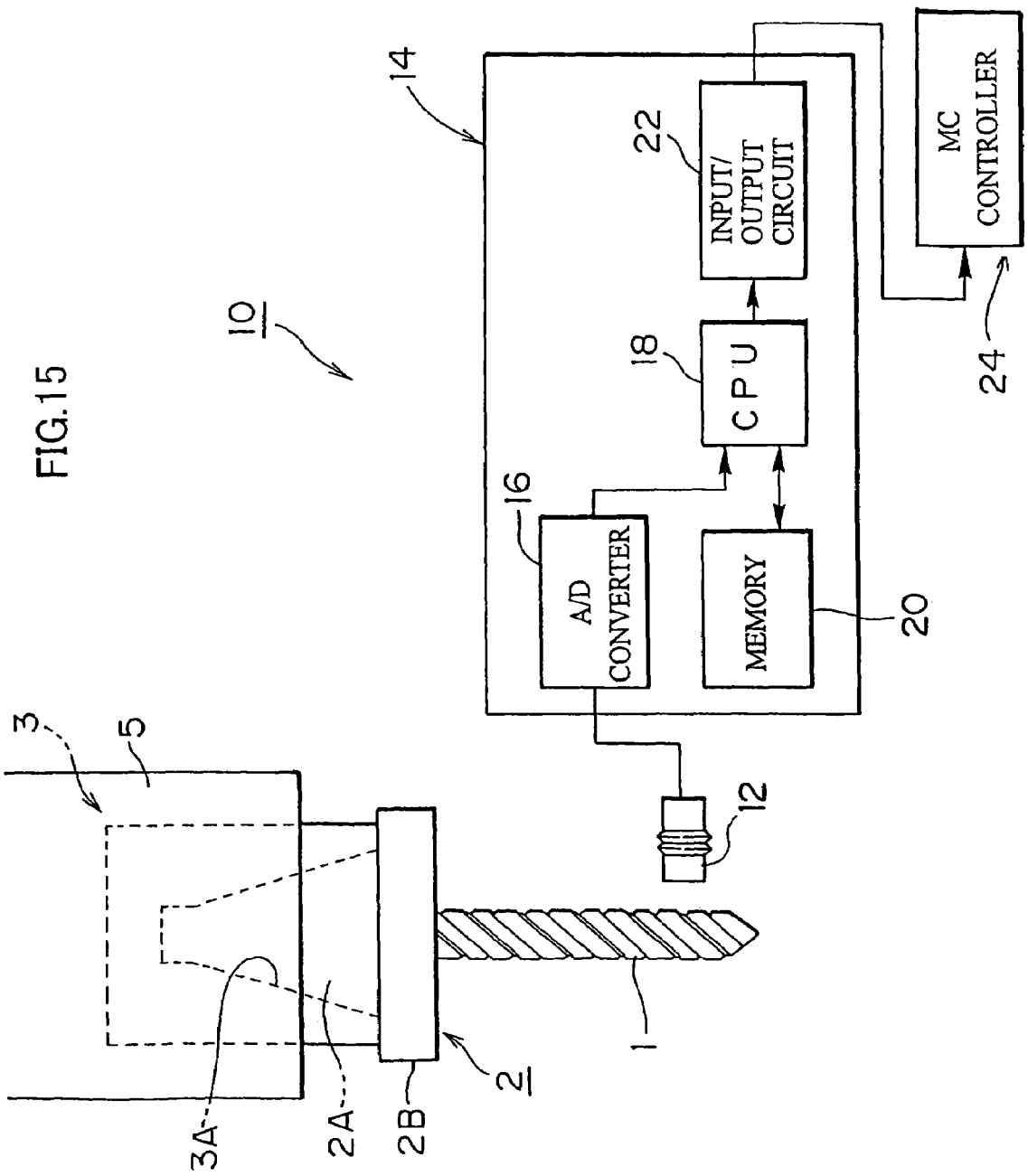

MACHINE TOOL

CROSS-REFERENCE TO RELATED APPLICATION

This application is a division of U.S. patent application Ser. No. 10/415,068 which is a 371 of PCT/JP01/09442 filed Oct. 26, 2001, and is now U.S. Pat. No. 7,037,248.

TECHNICAL FIELD

The present invention relates to a machine tool and, more particularly, to a machine tool which automatically detects chuck errors in a tool on a machining center.

BACKGROUND ART

A machining center (MC) is a machine which automatically selects various tools according to machining steps and automatically mounts these tools on a main spindle so as to perform various kinds of machining. In the MC, a tool change is made by an automatic tool holder changing (ATC) device, and the ATC device automatically takes out a tool holder, to which a tool is attached, from a tool magazine and automatically mounts the tool holder on the main spindle.

As shown in FIG. 14(a), a tool holder 2 holding a tool 1 has a conical engaging portion 2A, and mounting is performed by engaging the engaging portion 2A in a conical engaged portion 3A formed in a main spindle 3; however, as shown in FIG. 14(b), if chips 4, etc. are caught at these engagement portions, the mounting is performed in a state where the axis is displaced. If machining is then performed in this state, vibration occurs in the tool 1, generating the defect that the machining accuracy of the work decreases greatly.

Conventionally, such a chuck error of a tool holder is detected, for example, by casting laser light upon the tip of the tool on the tool holder mounted on the main spindle to detect whether the tip of the tool is present at a prescribed position. That is, the tip of the tool should always be present at the prescribed position if there is no chuck error in the tool holder, and a case where the tip of the tool is not at the prescribed position is judged to be a chuck error.

However, the conventional method by which whether the tip of the tool is at a prescribed position is detected by use of laser light has the disadvantage that detection errors are liable to occur when a large amount of coolant is used as in an MC because laser light is apt to be shut off by the coolant.

The present invention has been made in consideration of such a situation, and has as its object the provision of a machine tool which can easily and positively detect chuck errors.

SUMMARY OF THE INVENTION

In order to attain the above-described object, a machine tool according to the present invention is characterized in that: a machine tool in which a tool holder attached with a tool is mounted on a main spindle and which performs rotational driving of the main spindle to machine a work, comprises a measuring device which measures a displacement of a peripheral surface of a flange of the tool holder mounted on the main spindle; and a judging device which judges an abnormality of the machine tool from measurement data obtained by the measuring device.

According to the present invention, the displacement of a peripheral surface of a flange of a tool holder mounted on the main spindle is measured, and an abnormality of the machine tool is judged from the measurement data. Thus, chuck errors of the tool holder can be positively detected.

BRIEF DESCRIPTION OF THE DRAWINGS

FIG. 7 is a conceptual diagram of a method of detecting chuck errors of the third embodiment;

FIG. 10(b) is a graph of phase-corrected measurement data.

FIG. 14(a) and FIG. 14(b) are explanatory drawings of a tool holder; and

FIG. 15 is a block diagram showing another embodiment of a chuck error detecting device.

THE PREFERRED EMBODIMENTS FOR CARRYING OUT THE INVENTION

Preferred embodiments of a machine tool related to the present invention will be described below with reference to the attached drawings.

Figure 1:
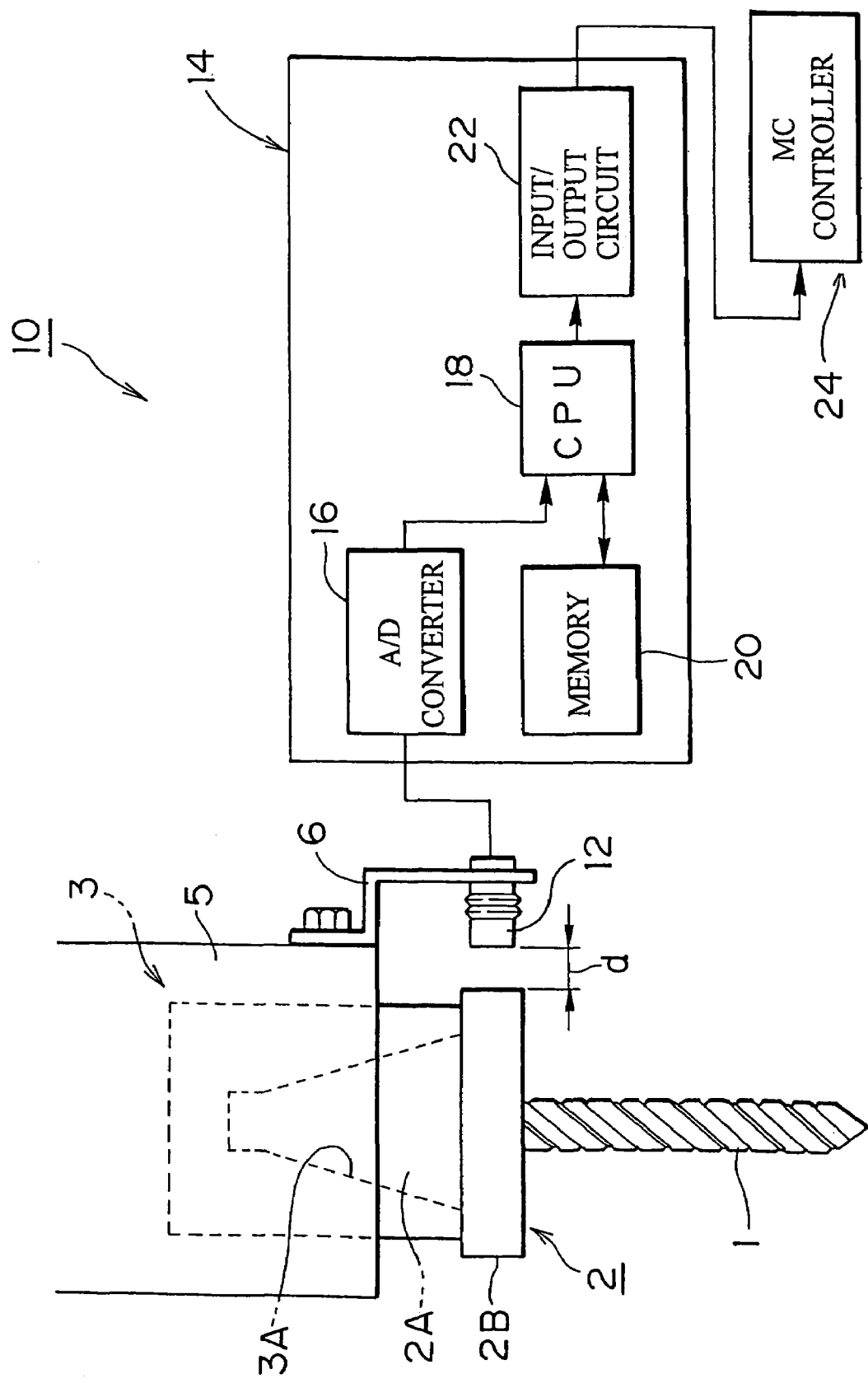
FIG. 1 is a block diagram showing the first embodiment of the chuck error detecting device.

FIG. 1 is a block diagram showing a machine tool T with the first embodiment of a chuck error detecting device according to the present invention built in. The chuck error detecting device 10 is a measuring device automatically detecting chuck errors of a tool holder 2 mounted on a main spindle 3 by an ATC device, and is mainly constituted by a sensor 12 and a data processor 14.

The sensor 12 is attached through a bracket 6 to a head 5 with the main spindle 3 attached. The sensor 12 is an eddy current sensor and determines the distance d to a peripheral surface of a flange portion 2B of the tool holder 2 mounted on the main spindle 3 as electrical signals.

The data processor 14 detects chuck errors of the tool holder 2 on the basis of measurement data measured by the sensor 12, and comprises an A/D converter 16, a CPU 18, a memory 20, an input/output circuit 22, etc.

The A/D converter 16 converts an electrical signal representing the distance d outputted from the sensor 12 into a digital signal, and outputs the digital signal to the CPU 18. The CPU 18, functioning as a calculating device, calculates an amount of eccentricity T of the tool holder 2 on the basis of the measurement data of the sensor 12 converted into the digital signal. Then, the CPU 18 makes a comparison between the calculated amount of eccentricity T and a tolerance S stored beforehand in the memory 20, and acting as a judging device, the CPU 18 judges a case where the amount of eccentricity T exceeds the tolerance S to be a chuck error. Then, the CPU 18 outputs the result through the input/output circuit 22 to an MC controller 24 controlling the MC.

As described above, the CPU 18 calculates an amount of eccentricity T of the tool holder 2 on the basis of the measurement data on the distance d measured by the sensor 12, and this calculation processing is performed as described below.

Figure 2:
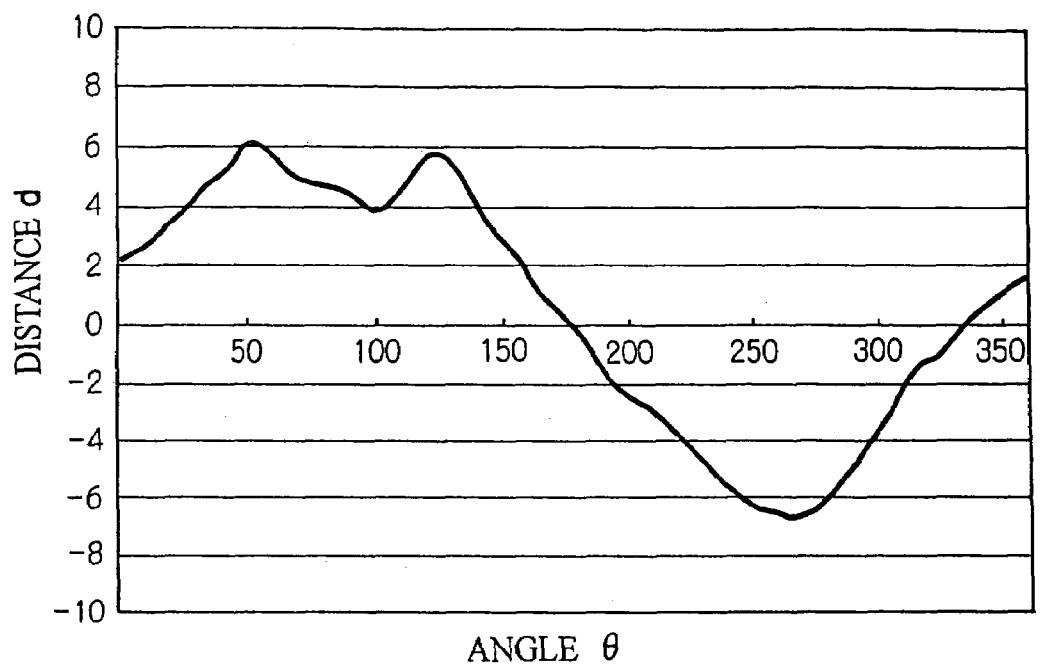
FIG. 2 is a graph of measurement data on one rotation of a tool holder.

First, the CPU 18 receives a command to start measurement from the MC controller 24 through the input/output circuit 22. Then, the CPU 18 stores the measurement data on the distance d outputted from the sensor 12 in the memory 20 by correlating the measurement data to the rotational angle θ of the tool holder 2. This measurement is carried out for one rotation of the tool holder. The measurement data on the distance d for one rotation of the tool holder is graphically represented as shown in FIG. 2, for example.

Next, the CPU 18 makes a Fourier analysis of the measurement data on the distance d for one rotation of the tool holder stored in the memory 20 by use of, for example, Fast Fourier Transform (FFT). That is, the measurement data for one rotation of the tool holder is subjected to a Fourier analysis and decomposed into components of frequencies.

Figure 3:
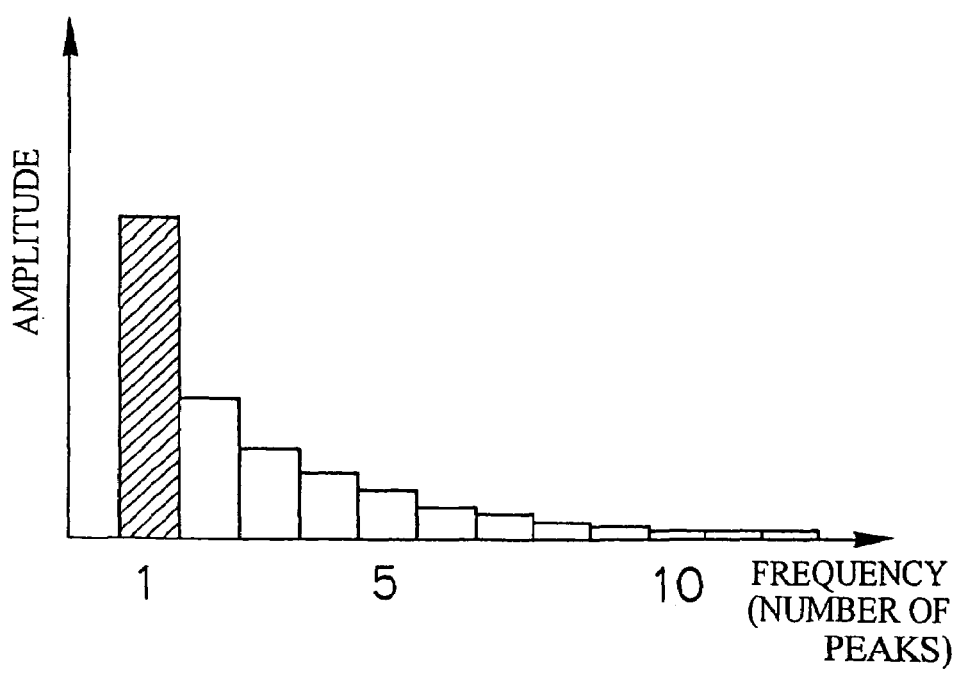
FIG. 3 is a graph showing a result of an FFT analysis in terms of a power spectrum.

Incidentally, the FFT analysis may be carried out at the same time with the measurement. The result of the FFT measurement is shown in terms of a power spectrum as in FIG. 3, for example.

The amplitude value of the fundamental frequency component (a component of one peak) among the frequency components subjected to the FFT analysis as described above can be regarded as the double of an amount of eccentricity of the tool holder 2, and the CPU 18 hence extracts the fundamental frequency component from the result of the above-described FFT analysis, calculates the amplitude value thereof, and obtains an amount of eccentricity T of the tool holder 2. Then, the CPU 18 makes a judgment on chuck errors on the basis of this obtained amount of eccentricity T.

Figure 4:
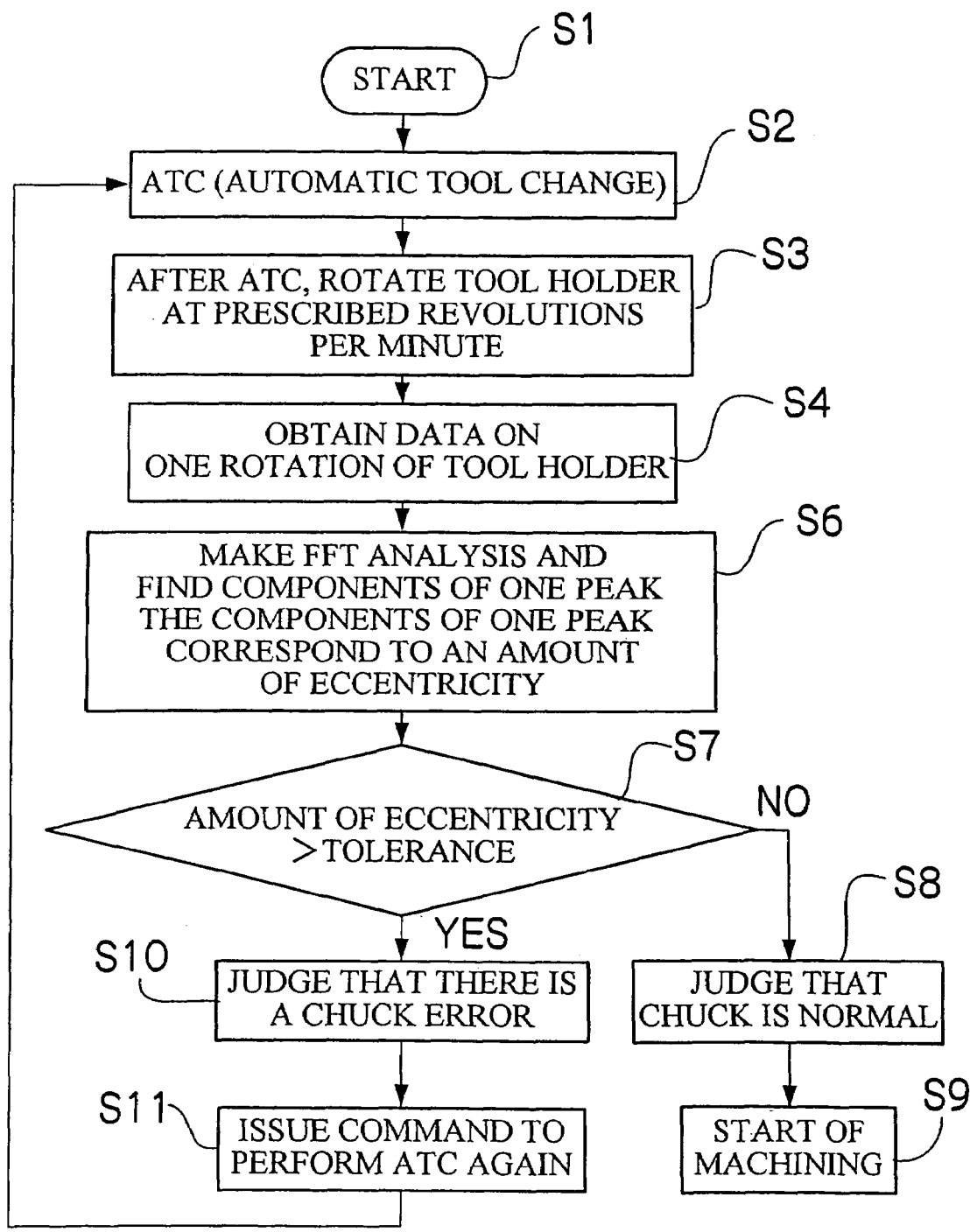
FIG. 4 is a flow chart showing an action procedure for a method of detecting chuck errors of the first embodiment.

Next, a method of detecting chuck errors of the tool holder 2 by use of the chuck error detecting device 10 of the present embodiment which is configured as described above will be described below with reference to the flow chart shown in FIG. 4.

The chuck error detecting device 10 is started upon the start of the operation of The MC (Step S1). When an automatic tool holder change (ATC) is performed by the ATC device (Step S2), the MC controller 24 rotates the main spindle at revolutions per minute which are set beforehand (Step S3).

The sensor 12 measures the distance d to a peripheral surface of the flange portion 2B of the rotating tool holder 2. The CPU 18 stores the measurement data on the distance d measured by the sensor 12 in the memory 20 by correlating the measurement data to the rotational angle θ of the tool holder 2.

The measurement is carried out for one rotation of the tool holder (Step S4), and measurement data on one rotation of the tool holder is obtained.

The CPU 18 makes an FFT analysis of the measurement data stored in the memory 20, extracts data on a component of one peak, and calculates the amplitude value thereof. Since the amplitude value of the component of one peak is equal to the double of an amount of eccentricity T of the tool holder 2, the amount of eccentricity T of the tool holder 2 is thus obtained from the amplitude value (Step S6). The CPU 18 makes a comparison between the obtained amount of eccentricity T and the tolerance S, and judges whether there is a chuck error (Step S7).

Incidentally, the FFT analysis may be carried out at the same time with the measurement. Moreover, the tolerance S is inputted by an operator through an input device (not shown) before the start of the operation of the MC. The inputted tolerance S is stored in the memory 20. Furthermore, the tolerance S is set on the basis of the machining accuracy required by the user by appropriately selecting an optimum value within the permissible range of the vibration induced by the deflection of the tool holder 2.

The result of the judgment is outputted to the MC controller 24. When it is judged that the chuck is normal (amount of eccentricity T<tolerance S) (Step S8), the MC controller 24 starts machining as it is (Step S9). On the other hand, when it is judged that there is a chuck error (amount of eccentricity T≧tolerance S) (Step S10), an automatic tool holder change (ATC) is performed again (Step S11). In this case, detection of chuck errors is performed again for the tool holder 2 for which an ATC has been made again.

Incidentally, since the possibility that chips are caught in the engagement portions between the tool holder 2 and the main spindle 3 is conceivable in the case of the chuck error, in this case the chips are removed by injecting air etc. into the engaged portion 3A of the main spindle 3.

As described above, according to the chuck error detecting device 10 of the present embodiment, an amount of eccentricity of the tool holder 2 is measured, and a chuck error of the tool holder 2 is detected on the basis of the amount of eccentricity. Therefore, a chuck error of the tool holder 2 can be accurately detected. Furthermore, since the construction of the devices is very simple and complicated control is not required, detection can be easily carried out.

Next, the second embodiment of a machine tool according to the present invention will be described below. Incidentally, the devices to be used are the same as those of the above-described first embodiment.

Figure 5:
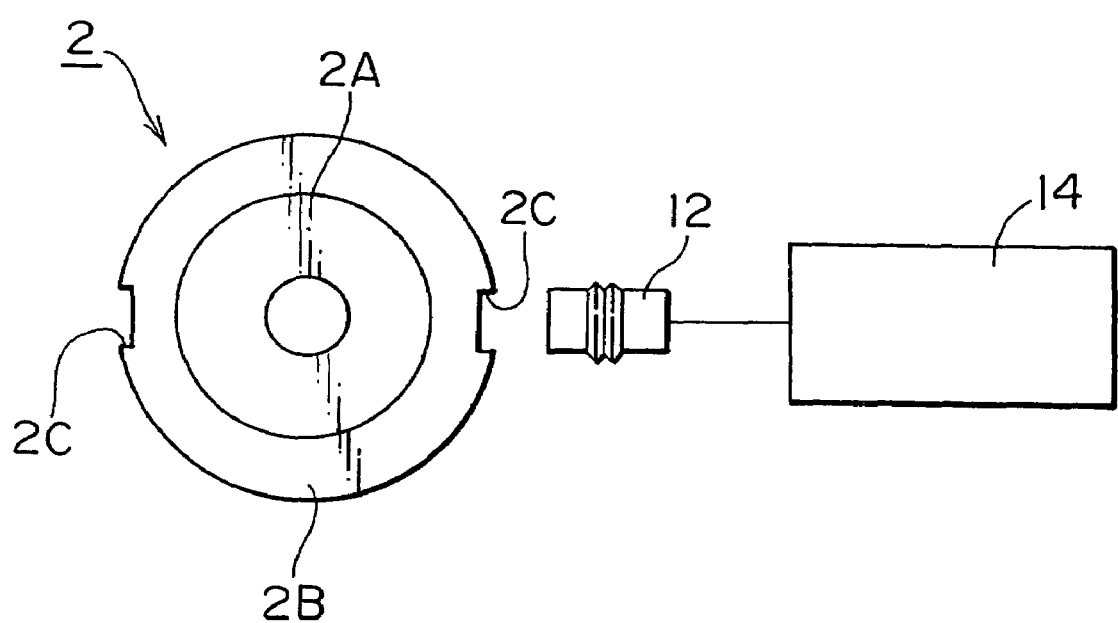
FIG. 5 is a plan view of a tool holder having notches in a flange portion.

The above-described first embodiment relates to a case where the flange portion 2B of the tool holder 2, which is the part measured by the sensor 12, is circular. In general, however, in the flange portion 2B of the tool holder 2 are formed notches 2C, 2C for chucking as shown in FIG. 5.

The method of detecting chuck errors of the second embodiment is a detection method for a case where the notches 2C, 2C are formed in the flange portion 2B of the tool holder 2, which is the part to be measured.

Figure 6B:
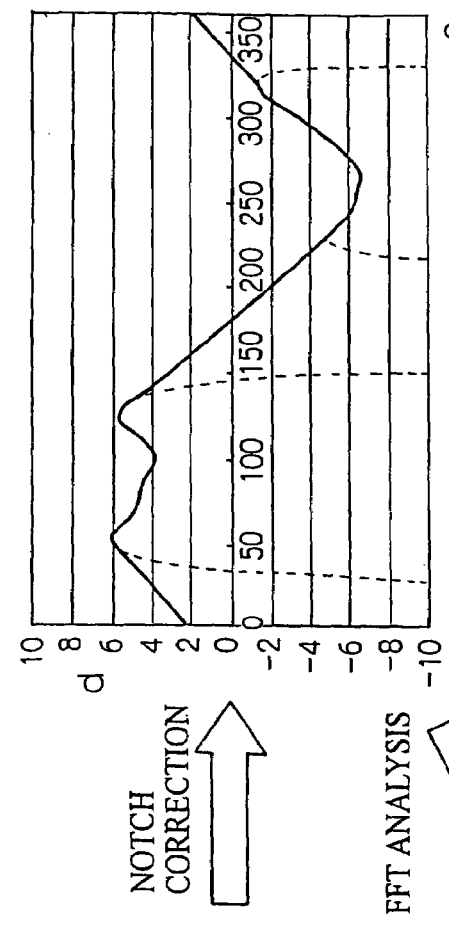
FIG. 6(b) is a graph of corrected measurement data.
Figure 6A:
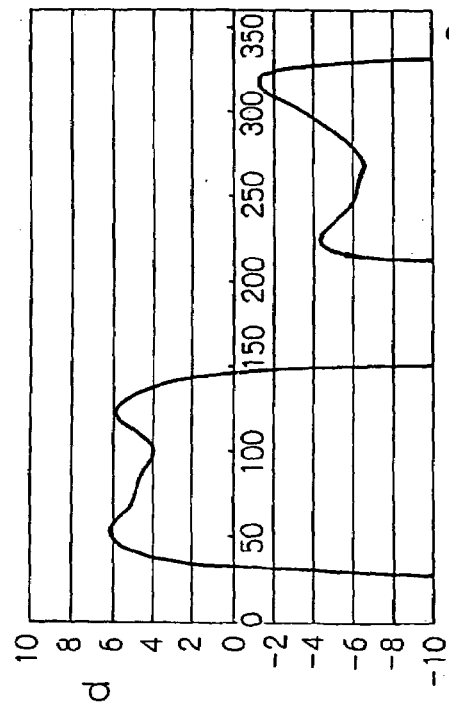
FIG. 6(a) is a graph of measurement data of a tool holder having notches in a flange portion.
Figure 6C:
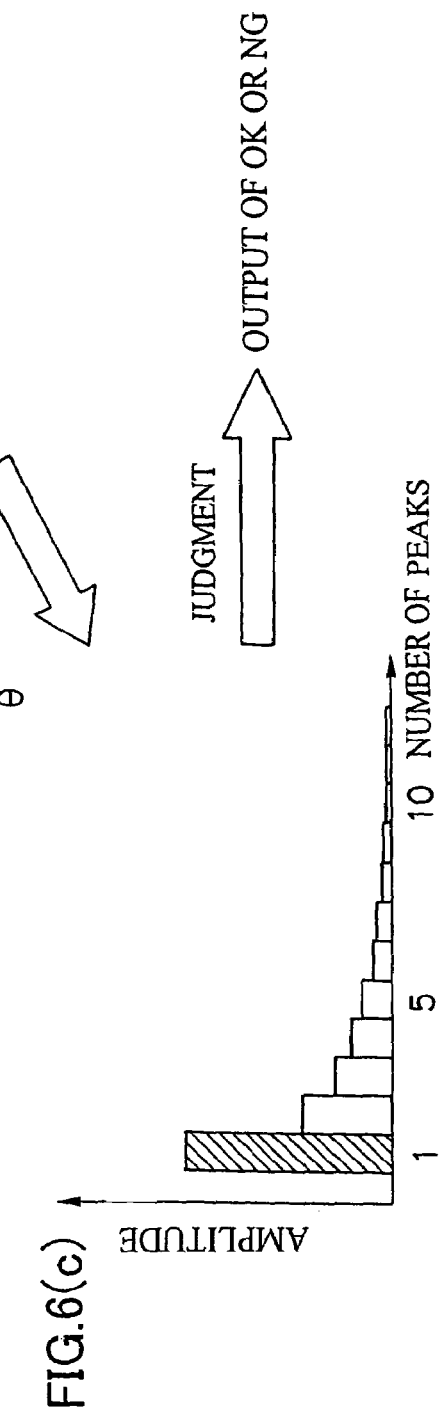
FIG. 6(c) is a graph showing a result of an FFT analysis in terms of a power spectrum.

In the case where the flange portion 2B of the tool holder 2 has notches 2C, 2C in two places, the measurement data for one rotation of the tool holder is graphically represented as shown in FIG. 6(*a*), for example. As shown in FIG. 6(*a*), the measurement data changes abruptly in the portions corresponding to the two notches 2C, 2C. The measurement data of the portions corresponding to the notches 2C, 2C is supplemented by linear interpolation, for example. FIG. 6(*b*) graphically represents measurement data after the linear interpolation of the portions corresponding to the notches 2C, 2C.

In this manner, in the case where there are the notches 2C, 2C on the flange portion 2B of the tool holder 2, which is the part measured by the sensor 12, the measurement data of the portions corresponding to the notches 2C, 2C is supplemented, the supplemented data is subjected to the FFT analysis (FIG. 6(*c*)), data on the component of one peak is extracted, and an amount of eccentricity (amplitude value) T is calculated. Then, a judgment on chuck errors is made on the basis of the result of the calculation. Thus, it is also possible to effectively detect chuck errors for the tool holder having the notches in the flange portion.

Next, the third embodiment of a machine tool according to the present invention will be described below. Incidentally, the devices to be used are the same as those of the above-described first embodiment.

In a case where an eddy current sensor is used as the sensor, the shape of the tool holder may sometimes be out of an exact circle due to the effect of magnetization, the effect of a change in the wall thickness (area) of the measured part of the tool holder, etc. If an amount of eccentricity is calculated in this state, errors are included, with the result that the detection accuracy might be lowered.

Hence, in order to perform detection with higher accuracy, chuck errors are detected by the following method. That is, as shown in FIG. 7, an amount of eccentricity of the tool holder 2 mounted in a condition with no chuck errors is measured beforehand, and this amount of eccentricity is regarded as the amount of basic eccentricity intrinsic to the tool holder and is stored. Then, an amount of true eccentricity is calculated by making a comparison between the amount of basic eccentricity and the amount of measured eccentricity measured upon an ATC, and a judgment on chuck errors is made on the basis of the calculated amount of true eccentricity.

Figure 8:
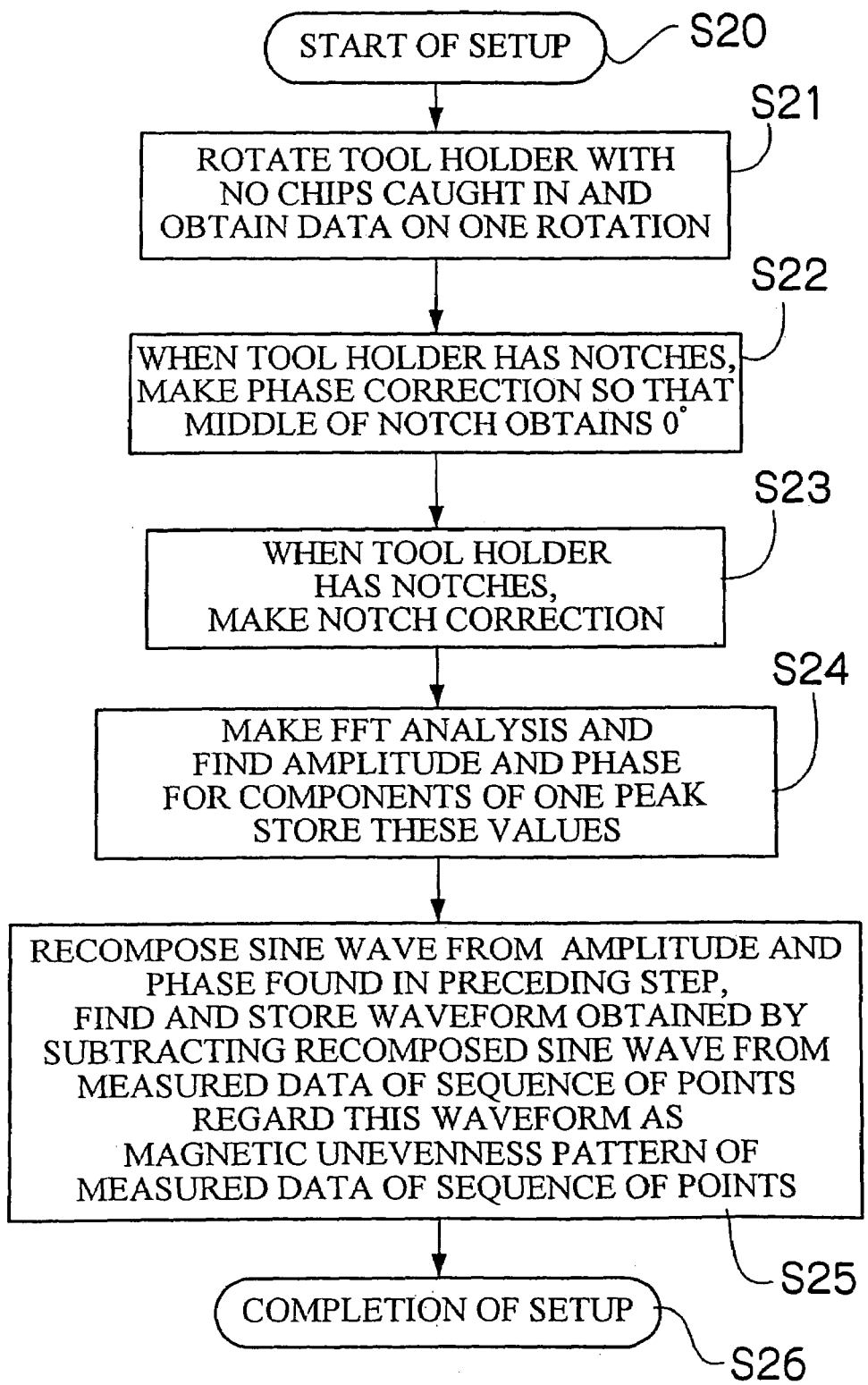
FIG. 8 is a flow chart for a setup.

The method of detecting chuck errors of the third embodiment will be described below with reference to the flow charts shown in FIGS. 8 and 9.

First, a setup is performed in order to detect an amount of basic eccentricity (Step S20). The setup is performed before the start of the operation of the MC in accordance with the flow chart shown in FIG. 8.

The tool holder 2 is mounted on the main spindle 3. Since this is before the start of the operation, no chips are caught in and the tool holder 2 is mounted on the main spindle 3 without any chuck error. The tool holder 2 is rotated in this condition, and a change in the distance d for one rotation of the tool holder is measured by the sensor 12 (Step S21). The measurement data on the distance d for one rotation of a holder having notches is graphically represented as shown in FIG. 10(*a*), for example.

Next, when the tool holder 2 has notches, measurement data is phase-corrected so that the middle of either notch 2C of the two notches 2C, 2C obtains 0° as shown in FIG. 10(*b*) (Step S22). Then, the measurement data of the portions corresponding to the two notches 2C, 2C is corrected as shown in FIG. 10(*c*) (Step S23). Here, the measurement data is corrected by linear interpolation.

Incidentally, when the tool holder 2 has no notch, the above-described phase correction (Step S22) and notch correction (Step S23) are not performed, and the processing proceeds to the next step (Step S24).

Figure 12A:
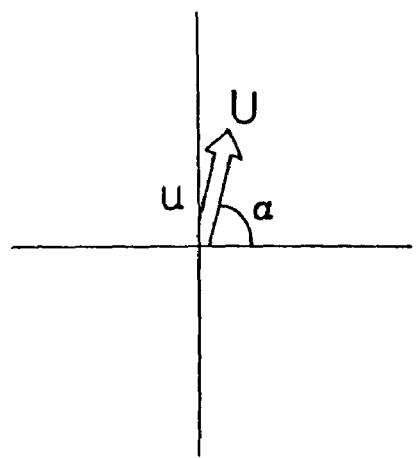
FIG. 12(a), FIG. 12(b) and FIG. 12(c) are conceptual diagrams of vector operation.
Figure 12B:
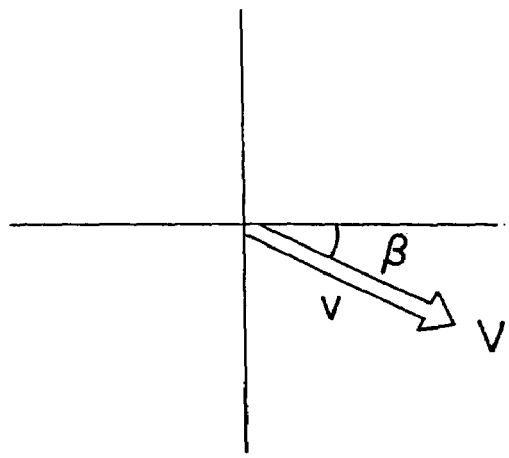
Figure 12C:
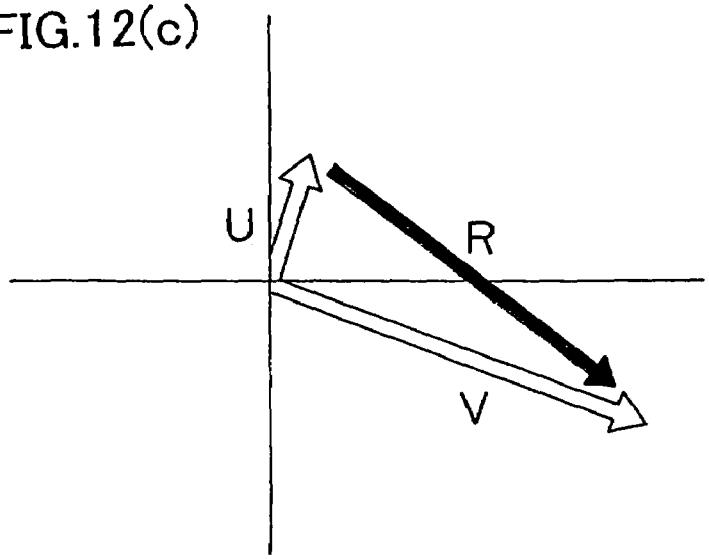

Next, an FFT analysis of measurement data is made and the amplitude and the phase (angle) of the component of one peak are calculated. Then, as shown in FIG. 12(*a*), the amount of eccentricity calculated from the amplitude and the phase are stored as an amount of basic eccentricity u and a direction of basic eccentricity a (hereinafter referred to as "a vector of basic eccentricity U"), respectively, in the memory 20 (Step S24).

Next, as shown in FIG. 10(*d*), a sine wave is recomposed from the calculated amplitude and phase for the component of one peak. Then, a waveform (waveform shown in FIG. 10(*e*)) is calculated by subtracting the recomposed sine wave data from the measurement data after the notch correction (original data) shown in FIG. 10(*c*). The calculated waveform is regarded as a magnetic unevenness pattern of the measured data of sequence of points and stored in the memory 20 (Step S25).

With the foregoing the setup operation is completed (Step S26). Incidentally, the setup operations are performed for all tool holders required by a user among the tool holders set in the tool magazine, data intrinsic to each tool holder is stored in the memory 20.

Figure 9:
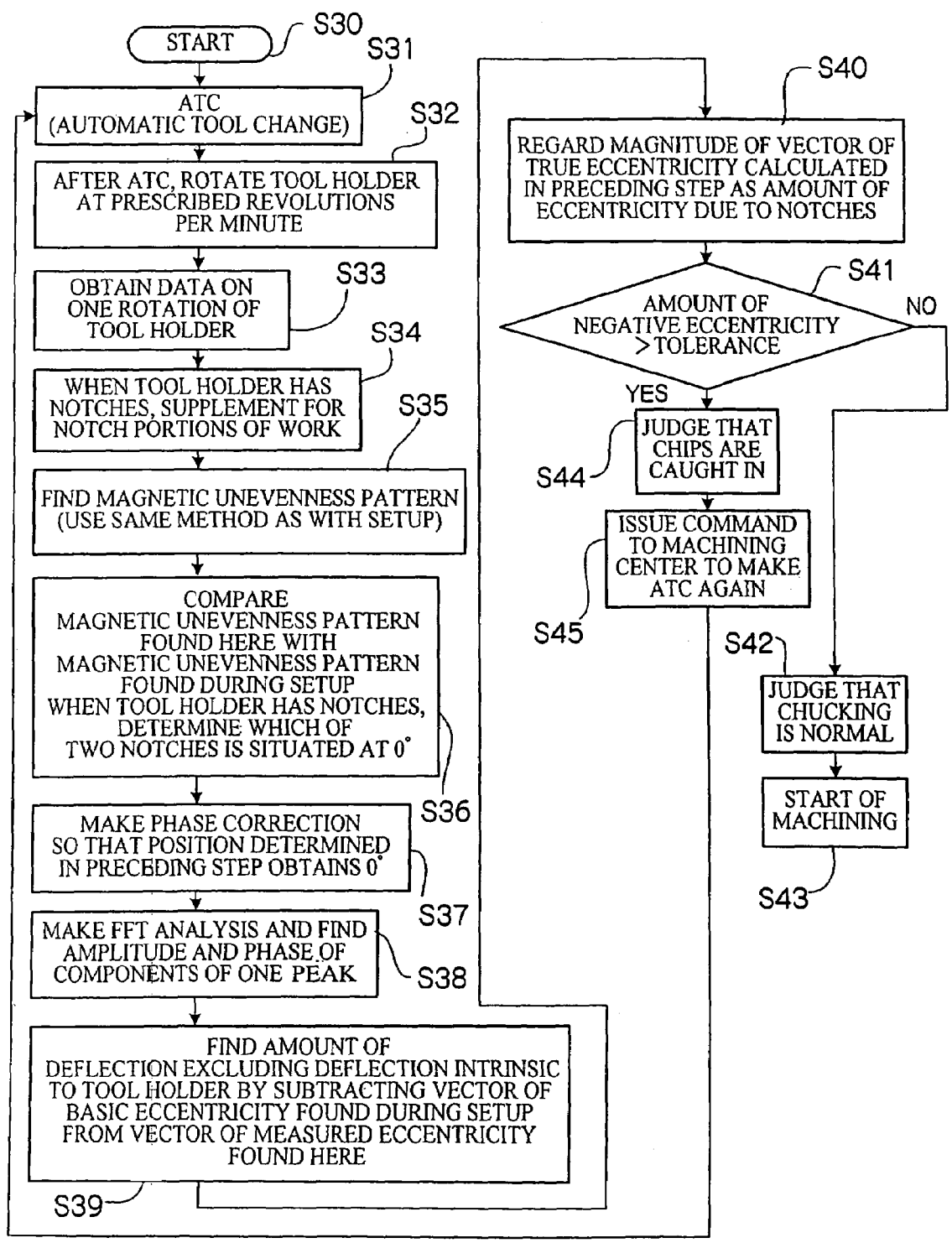
FIG. 9 is a flow chart for a detection.
Figure 10A:
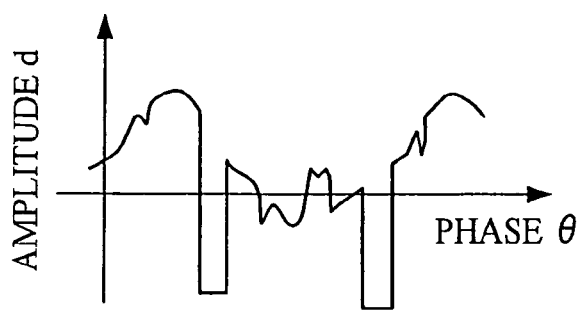
FIG. 10(a) is a graph of measurement data on one rotation of a tool holder mounted in a state free from chuck errors.
Figure 10C:
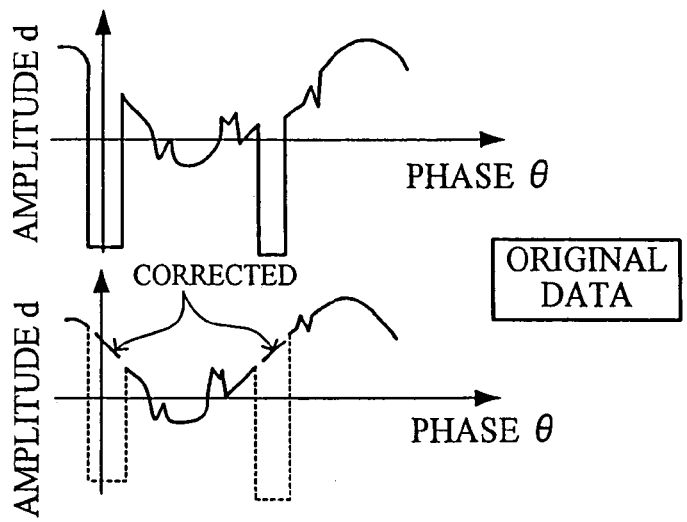
FIG. 10(c) is a graph of notch-corrected measurement data.
Figure 10D:
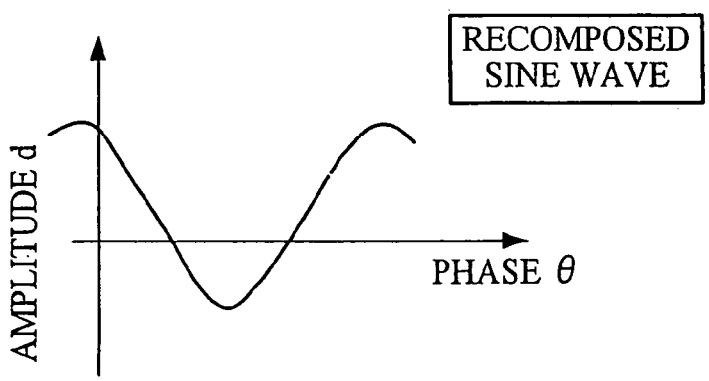
FIG. 10(d) is a graph showing a recomposed sine wave.
Figure 10E:
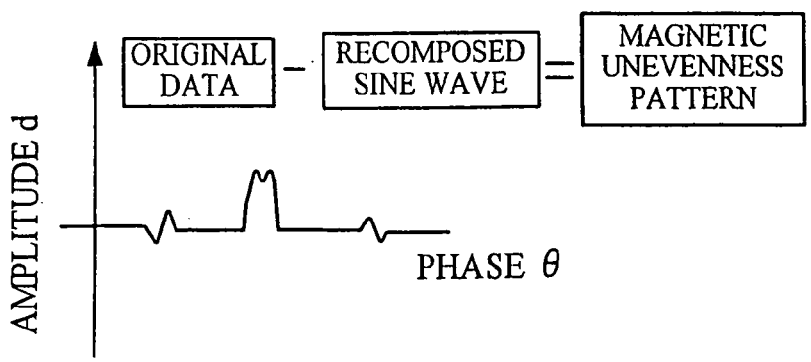
FIG. 10(e) is a graph showing a magnetic unevenness pattern.

When the operation of the MC is started, the detection of a chuck error of the tool holder is performed in accordance with the flow chart shown in FIG. 9 (Step S30).

When a tool change is made by the ATC device (Step S31), the tool holder 2 mounted on the main spindle 3 rotates at prescribed revolutions per minute (Step S32), and data for one rotation of the tool holder is obtained by the sensor 12 (Step S33). When the tool holder 2 has notches, a notch correction of the measurement data is made (Step S34) and after that, a magnetic unevenness pattern is found (Step S35). Incidentally, when the tool holder 2 has no notch, the processing for the notch correction (Step S34) is unnecessary.

Incidentally, the method of obtaining measurement data and the method of making the notch correction when the tool holder 2 has notches are the same as in the above-described first and second embodiments, and the method of finding the magnetic unevenness pattern is the same as with the above-described setup.

Figure 11:
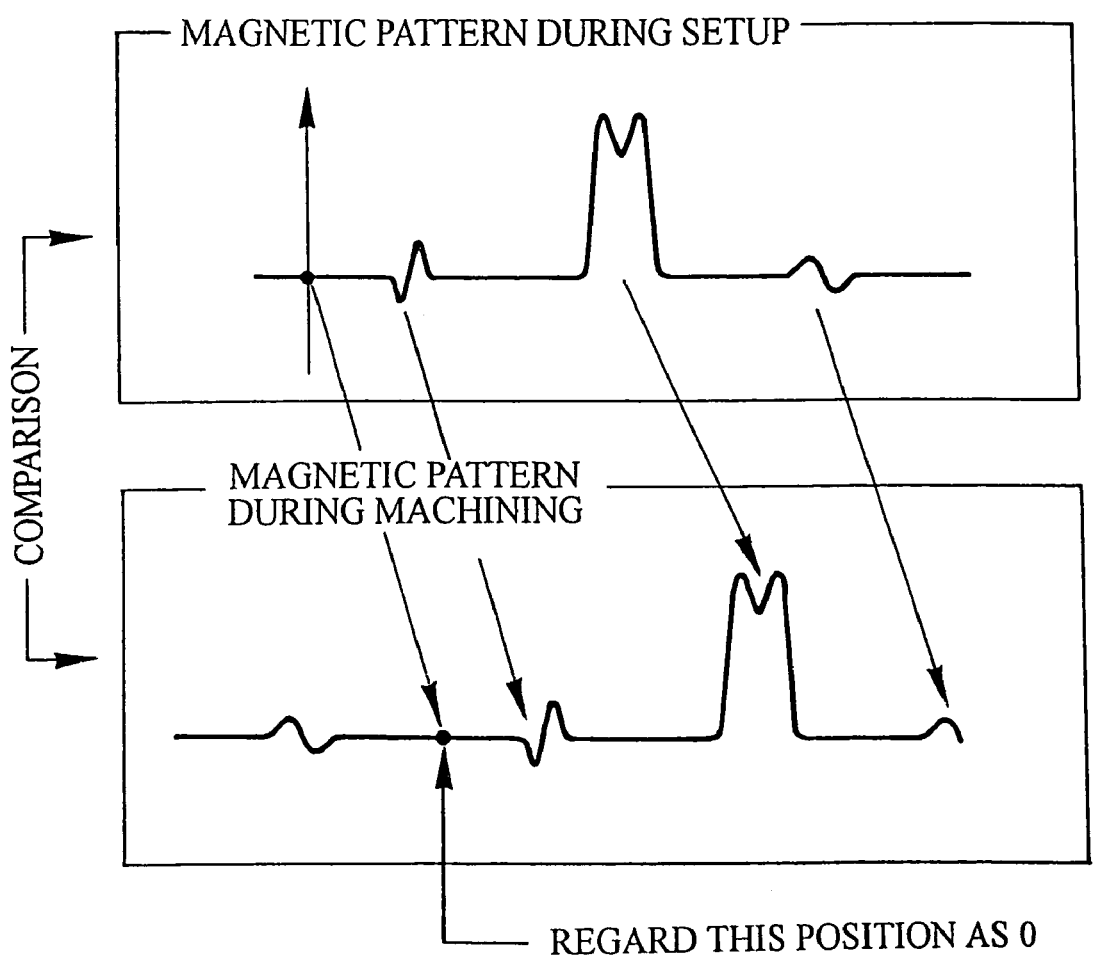
FIG. 11 is a conceptual diagram of phase correction.

Next, as shown in FIG. 11, a comparison is made between the calculated magnetic unevenness pattern (magnetic pattern during machining) and the magnetic unevenness pattern during the setup which has been stored in the memory 20 (magnetic pattern during the setup), and which position in the calculated magnetic unevenness pattern is situated at 0° is determined.

Incidentally, when the tool holder 2 has notches, which of the two notches 2C, 2C is situated at 0° is determined. Then, a phase correction of the notch-corrected measurement data is made so that the determined position obtains 0° (Step S37).

Next, an FFT analysis of the phase-corrected measurement data is made, and the amplitude and the phase of the component of one peak are calculated. Then, as shown in FIG. 12(*b*), the amount of eccentricity calculated from the amplitude and the phase are stored as an amount of measured eccentricity v and a direction of measured eccentricity β (hereinafter referred to as "a vector of measured eccentricity V"), respectively, in the memory 20 (Step S38).

Next, as shown in FIG. 12(*c*), a difference between the calculated vector of measured eccentricity V and the vector of basic eccentricity U stored in the memory 20 is calculated by vector operation (Step S39). Then, the calculated vector is regarded as a vector of true eccentricity R, the magnitude r of the vector of true eccentricity R is found (Step S40), this is regarded as an amount of true eccentricity r, and a judgment on chuck errors is made on the basis of the amount of true eccentricity r (Step S41). That is, a comparison is made between the amount of true eccentricity r and the tolerance S, and a case where the amount of true eccentricity r exceeds the tolerance S is judged to be a chuck error.

When as a result it is judged that the chucking is normal (the amount of eccentricity r<the tolerance S) (Step S42), machining is started as it is (Step S43), and when it is judged that it is a chuck error (the amount of eccentricity r≧the tolerance S) (Step S44), an automatic tool holder change (ATC) is made again (Step S45).

In this manner, in the method of detecting chuck errors of the present embodiment, the judgment on chuck errors is performed on the basis of the amount of true eccentricity r obtained by removing the amount of eccentricity intrinsic to the tool holder, it is thus possible to more accurately perform the detection of chuck errors.

Incidentally, in the present embodiment, since the direction of eccentricity can be determined from the vector of true eccentricity R, it is also possible to locate the position of chips, etc. caught in. Therefore, by concentrating on these located positions in injecting air, etc., it is possible to easily perform the removal of the chips, etc.

In the above-described series of embodiments, the measurement of the amount of eccentricity (including an amount of basic eccentricity and an amount of true eccentricity) is performed only once. However, it is also possible to carry out the measurement of the amount of eccentricity a plurality of times, and to regard an average value thereof as "a true amount of measured eccentricity" so as to make a judgment on chuck errors. Thereby, the reliability is improved and it becomes possible to make a judgment on chuck errors more accurately.

Figure 13:
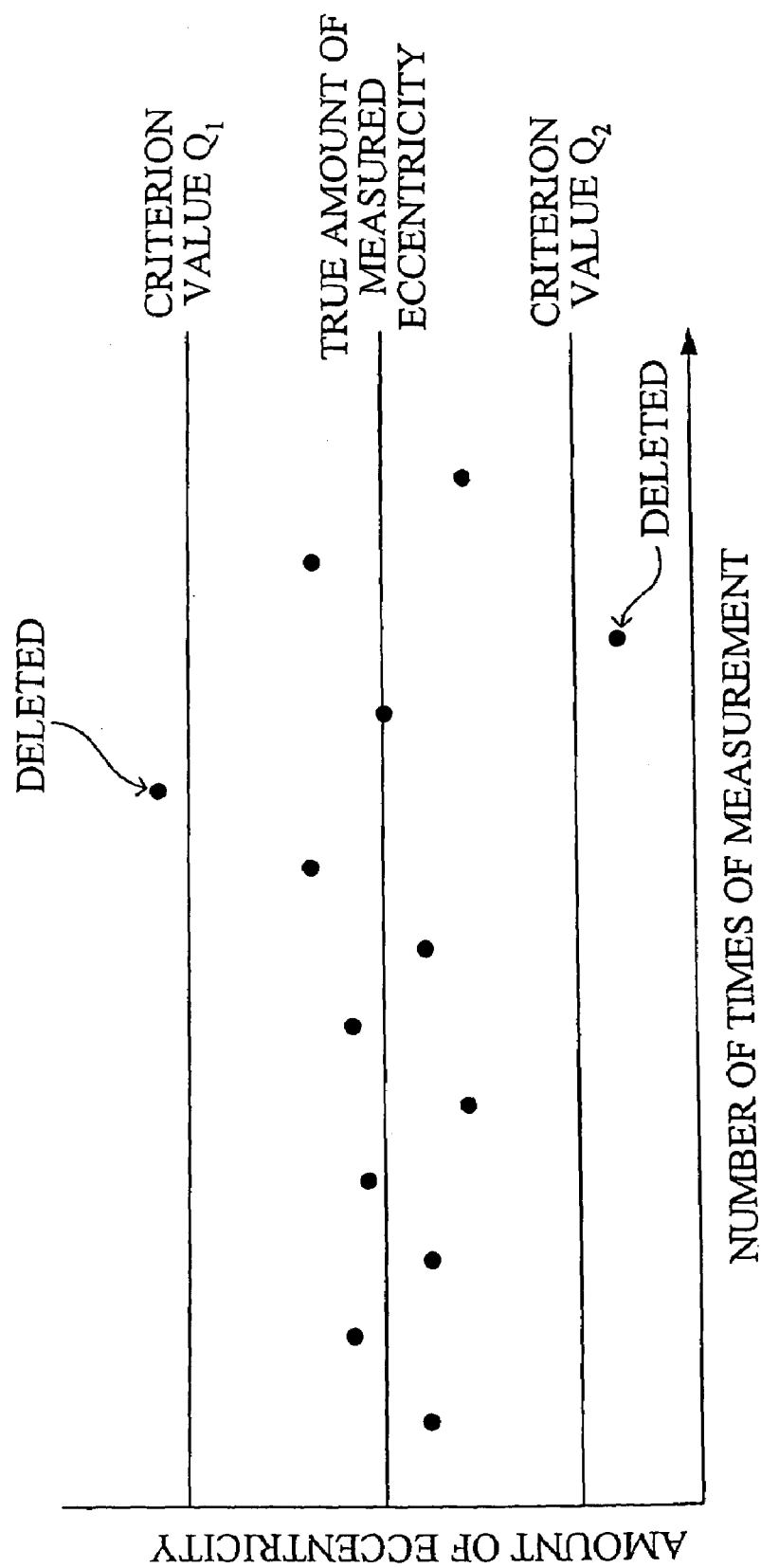
FIG. 13 is a graph of measurement data on amounts of eccentricity obtained by performing measurement a plurality of times.

Incidentally, in this case, as shown in FIG. 13, when there is measurement data of which value is extremely different from those of the other data, this measurement data is deleted to calculate an average value. That is, criterion values $Q_1$, $Q_2$ are set beforehand, and an average value is calculated by deleting measurement data exceeding the criterion values $Q_1$, $Q_2$. Thereby, it becomes possible to calculate an amount of eccentricity more accurately.

When a variation in the measurement data on the amount of eccentricity obtained by performing the measurements a large number of times, it might be thought that there is a chuck error or there is an abnormality in the MC. Therefore, this case may be judged to be an abnormality in the MC.

That is, a standard deviation, which is an index value indicating a statistic variation, of the measurement data on the amount of eccentricity obtained by performing measurement the plurality of times as described above is calculated by the CPU 18 acting as an index value calculating device, and when the standard deviation exceeds a set value which is set beforehand, the CPU 18, acting as a determining device, determines that the MC is abnormal and the result is outputted to the MC controller 24. On the basis of the result, the MC controller 24 issues an alarm and/or stops the operation of the MC, for example.

Furthermore, in the above-described series of embodiments, the eddy current sensor is used as the sensor 12. However, it is not limited to the eddy current sensor, and any other sensors may be used if the sensors can measure the distance from a specific measuring point to the peripheral surface of the tool holder 2. In this case, it is not limited to non-contact type sensors such as the eddy current sensor, and contact type sensors may be used.

Furthermore, in the above-described series of embodiments, an ATC is made again when the CPU 18 judges that there is a chuck error. However, in a case where a chuck error occurs even when an ATC is made again, action such as a stop of operation may be taken. That is, the CPU 18 is made to count the number of chuck errors, and when chuck errors occur continuously, the CPU 18 issues a command to the MC controller 24 to take action such as a stop of the operation of the MC. Thereby, an abnormality in the MC can be detected early. Incidentally, in this case an operator sets a specified value beforehand so as to issue commands such as a stop of the operation of the MC and an alarm when the number of times of chuck errors exceeds the specified value.

Furthermore, in the present embodiments, the displacement of the periphery of a tool holder is measured, the component of one peak is extracted by making an FFT analysis of the measurement data, and an amount of eccentricity is obtained by finding the amplitude value of the component. However, how to obtain an amount of eccentricity is not limited to this method.

Furthermore, in the present embodiments, the component of one peak is extracted by making an FFT analysis of measurement data, and an amount of eccentricity is obtained by finding the amplitude value thereof. However, an amount of eccentricity of a tool holder may be obtained by finding a maximum value and a minimum value of the measurement data and calculating the amount of eccentricity from a difference between the maximum and minimum values.

Furthermore, in the present embodiments, the flange portion 2B of the tool holder 2 is used as the part measured by the sensor 12. However, the part measured by the sensor 12 is not limited to this, and may be changed as appropriate according to the measuring condition, etc. For example, as shown in FIG. 15, a cutting edge (a part for cutting the work) of the tool 1 may be selected as the measured part. Thus, by using the cutting edge of the tool 1 as the measured part, it is possible to directly measure an amount of eccentricity of the part that performs machining, so that chuck errors can be more positively detected.

Furthermore, in the present embodiments, the sensor 12 attached to the head 5. However, the installation place of the sensor 12 is not limited to this, and the sensor 12 may be attached to a place other than the head 5. For example, the sensor 12 is fixed in a prescribed position other than the head 5, and the chuck error detection may be carried out in such a manner that the head 5 moves to the measuring position of the sensor 12. As installation positions of the sensor 12 other than the head, for example, the sensor 12 may be installed at the first origin of the MC (a reference point (starting point) on an ordinate where the head 5 is located in every machining) or at other arbitrary places. In this case, in order to ensure the most stable high-accuracy measurement, it is preferred that the sensor 12 be installed in a place where the sensor 12 is not affected by the coolant (a place where no coolant splashes).

Furthermore, in the present embodiments, the present invention has been described with the aid of examples in which the present invention is applied to the MC. However, the application of the present invention is not limited to the MC, and the present invention can be applied to any machine tool so long as the machine tool uses an ATC device.

Incidentally, in the above-described series of embodiments, an amount of eccentricity of a tool holder mounted on the main spindle is measured, and chuck errors are detected on the basis of this amount of eccentricity. An "amount of eccentricity" used here is synonymous with a "deflection" of a tool, and the deflection of the tool is measured by measuring the amount of eccentricity of the tool holder. Also, similarly a "displacement" and an "amount of eccentricity" are synonymous with each other, and a "displacement" and a "deflection" are also synonymous with each other.

INDUSTRIAL APPLICABILITY

As described above, according to the machine tool related to the present invention, an amount of eccentricity of a tool holder mounted on the main spindle is measured, and a case where this amount of eccentricity exceeds a tolerance set beforehand is judged to be a chuck error. Thus, chuck errors of the tool holder can be positively detected.

I claim:

1. A machine tool in which a tool holder attached with a tool is mounted on a main spindle and which performs rotational driving of the main spindle to machine a work, the machine tool comprising:
   a controller for controlling a machining center which automatically selects various tools according to machining steps to be performed and mounts the tools on the main spindle;
   a noncontact measuring device having an eddy current sensor which measures a displacement of a peripheral surface of a flange of the tool holder mounted on the main spindle in a radial direction;
   a judging device which judges an abnormality of the machine tool from measurement data obtained by the noncontact measuring device;
   an index value calculating device which calculates an index value indicating a statistical variation of a plurality of pieces of measurement data obtained by performing a measurement of the displacement of the peripheral surface of the flange of the tool holder by the noncontact measuring device a plurality of times and by deleting the measurement data of which a value is extremely different from those of the other measurement data; and
   a determining device which determines an abnormality in the machining center from the index value obtained by the index value calculating device and outputs the determination to said controller.

* * * * *